Dec. 20, 1966   R. V. BAUM   3,293,574
DIFFRACTION DELAY LINE FOR PULSE EXPANSION AND COMPRESSION
Filed Nov. 20, 1963

INVENTOR.
RICHARD V. BAUM
BY
ATTORNEY

United States Patent Office 3,293,574
Patented Dec. 20, 1966

3,293,574
DIFFRACTION DELAY LINE FOR PULSE
EXPANSION AND COMPRESSION
Richard V. Baum, Phoenix, Ariz., assignor to Goodyear Aerospace Corporation, Akron, Ohio, a corporation of Delaware
Filed Nov. 20, 1963, Ser. No. 325,109
4 Claims. (Cl. 333—30)

This invention relates to apparatus for expanding or compressing pulses in order to achieve increased pulse range in combination with improved sharpness in received signal characteristics.

Heretofore it has been known that Chirp radars have been designed in order to allow the radar transmitter to transmit a long pulse while retaining the range resolution normally associated with a short pulse. The advantage to this setup is that for a long pulse the peak transmitter power may be kept low, and small transmitter and wave guide components may be used. "Chirp" radar is disclosed in an article entitled "Theory and Design of Chirp Radar," July 1960, BSTJ, volume 39, pages 745 through 808. However, this "Chirp" radar is electronically complex and expensive. An easier and cheaper system is needed. Further, it would be highly desirable to utilize this same Chirp characteristic for sound waves, particularly in conjunction with sonar system so that the maximum range as well as signal resolution could be increased.

It is the general object of the present invention to provide a pulse transmitting medium to which an input transducer and an output transducer can be connected and into which a reflective grating can be cut to effect expansion or compression of signal pulses entering through the output transducer or input transducer, respectively.

A further object of the invention is to provide a quartz block having a reflective grating cut therein which reflects whatever sonic wave reaches it with some portion of the reflected wave front reaching a receiving crystal, the grating having an appropriate geometry so that the differences between time delays of several reflected signals can be made to vary in a desired manner to effect pulse expansion or compression.

A further object of the invention is to provide a method to effect pulse expansion or compression which can be utilized to transmit a relatively long, low power pulse while retaining the signal resolution advantage normally associated with a relatively short, high power pulse.

A further object of the invention is to provide a substantially solid structure without utilizing electronic elements to effect pulse compression or expansion as desired, and which structure is durable, highly effective, and low in cost.

The aforesaid objects of the invention and other objects which will become apparent as the description proceeds are provided in an apparatus to effect expansion or compression of a pulse which includes the combination of a substantially rectangularly shaped quartz block having one end cut to a desired bevel angle and the other end step cut to provide a substantially square shaped extension therefrom, an input crystal transducer operatively affixed to the end of the shorter part of the step cut, an output crystal transducer operatively affixed to the substantially square extension and a reflective grating cut into the beveled end of the quartz block to reflect any ultrasonic wave impinging thereon in proportion to frequency. Further, the invention contemplates a method of pulse expansion or compression which includes the steps of transmitting a pulse into a medium, reflecting the pulse within the medium in proportion to frequency, and receiving the reflected pulse out of the medium.

For a better understanding of the invention reference should be had to the accompanying drawings, wherein.

While it is possible to use the principles of the invention in connection with acoustic delay involving either a reflection or a transmission grating, a solid or a liquid medium, either sheer or compression waves or a combination of both, and for pulses of any type the invention normally contemplates "Chirp" characteristics for electrical or sonic pulses by utilizing a quartz block as the medium, with a reflection grating cut therein and quartz crystal transducers thereon, and hence the invention has been so illustrated and will be so described.

It should be understood that the invention is concerned with achieving a "Chirp" phenomenon by means of ultrasonic sound waves without the relative complex R-C circuits utilized heretofore to achieve expansion or compression of electromagnetic radar pulses. It is known that "Chirp" radars have been utilized for some time as disclosed by the Bell Laboratories in an article cited above. However, this article deals only in the realm of electromagnetic waves, and is not concerned with pulse expansion or compression in a sonic medium. However, in order for the long pulse to provide the range resolution normally associated with the shorter one, it is necessary that the long pulse have a spectral width essentially similar to that of the shorter one. In order to achieve this one may start with a short pulse and pass it through a network with an essentially flat amplitude pass band and a quadratic variation of phase lag with frequency over the spectral width of interest in order to achieve out of the network a long pulse which has the same spectral width as the short input pulse. When the long pulse is received back again its spectrum can be inverted so that the same network can be used to collapse the reflected pulse back to its original time length.

Figure 1:
FIGURE 1 is a diagrammatic illustration of a normal electrical radar pulse or a continuous frequency sonic pulse.
Figure 2:
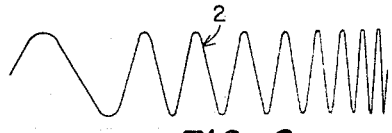
FIGURE 2 is a diagrammatic illustration of an increasing frequency electrical radar pulse or sonic pulse.

A standard constant frequency electro-magnetic radar or acoustic sonar pulse is indicated by the numeral 1 in FIGURE 1. The problem of generation of the pulse 1 is relatively simple, and is well known, but it has been found that a constant frequency pulse of a given time duration will not provide as sharp, accurate range resolution for closely spaced targets as an increasing frequency pulse of the same time duration, indicated by numeral 2 in FIGURE 2.

Figure 3:
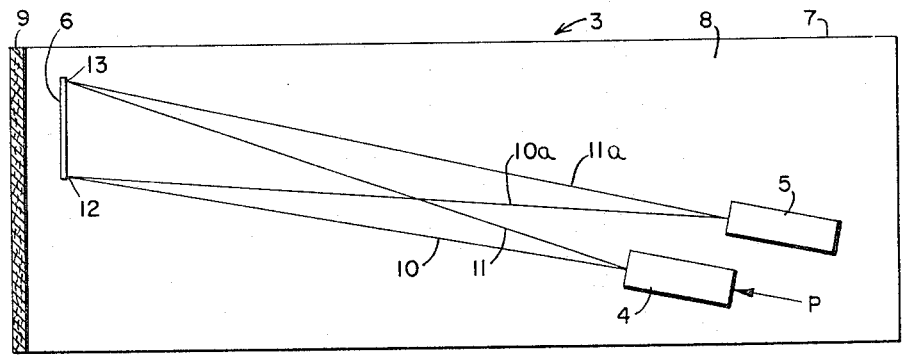
FIGURE 3 is a diagrammatic illustration of experimental apparatus utilized to prove the method of the invention.

The problems of expanding or compressing an ultrasonic acoustic pulse of increasing frequency are considerable. In one effort to solve the problems, an experimental apparatus, indicated generally by numeral 3 in FIGURE 3, was provided. The apparatus 3 includes a transmitter transducer 4, a receiver transducer 5, a reflective grating 6, a tank 7, a transmitting medium 8 in the tank 7, such as water, and an absorber 9. The reflective grating 6 was one of a standard type known in the art which is responsive proportional to frequency. A Fresnel lens is an example of such a grating. An ultrasonic pulse P introduced into the input transducer 4 is transmitted throughout the water medium 8 which pulse P can be indicated as a plurality of individual ultrasonic pulses 10 and 11, respectively. It should be recognized that pulses 10 and 11 each have the same frequency characteristics as pulse P. The pulses 10 and 11 then reflect off reflection grating 6 as pulses 10a and 11a which also are transmitted back through the medium 8, portions of which reach the output transducer 5 where it is found that the total received signal is expanded in time with respect to the transmitted pulse with no change in spectral width. An analysis of this phenomenon reveals that each element of the reflective grating 6 reflects whatever sonic wave reaches it with the useful portion of the reflected wave front being intercepted by the receiving transducer 5. Thus by choosing an appropriate geometry for the reflective grating 6 as more fully pointed out hereinafter, the differences between the time delays of the reflected signals 10 and 11 can be made to vary in an appropriate manner.

It can be seen that pulse 10 impinging upon grating 6 at point 12 and reflecting therefrom as pulse 10a travels a shorter path to receiving transducer 5 than pulse 11 impinging upon grating 6 at point 13 and reflecting therefrom as pulse 11a to be focused on receiving transducer 5. Therefore, if portion 12 of reflection grating 6 reflects only the higher frequency portion of pulse 10 and portion 13 of reflection grating 6 reflects only the lower frequency portion of pulse 11, it is readily seen that expansion of the original input pulse through transducer 4 is achieved at transducer 5. It must be realized that in order to achieve this pulse expansion when the elements of the grating are equally spaced, the transducers 4 and 5 must be in offset alignment to reflection grating 6. However, if a non-uniform grating is used, such offset may not be necessary. Also, in order that the differences between the time delays of the several reflected signals can be made to vary in an appropriate manner, the reflection grating 6 must be chosen of an appropriate geometry from point 12 to point 13 along the face thereof.

Figure 4:
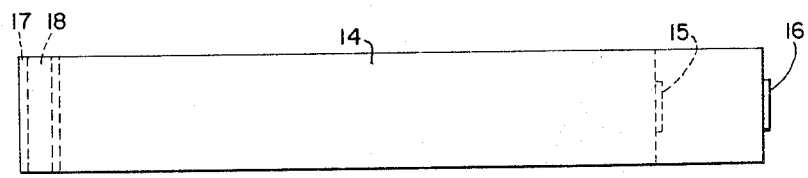
FIGURE 4 is a plan view of the quartz block and employing the embodiments of the invention.
Figure 5:
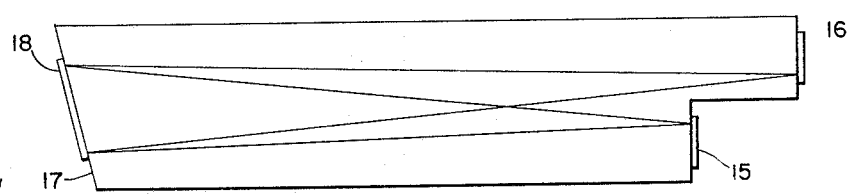
FIGURE 5 is a side elevation of the quartz block of FIGURE 4.

FIGURE 4 illustrates a quartz block 14 with quartz crystal transducers 15 and 16, respectively. With reference to FIGURE 5, it is seen that the end of the quartz block 14 opposite the transducers 15 and 16 has a beveled face 17 which is purposely cut at a specific angle in relation to the transducers 15 and 16 to achieve the offset alignment relationship described above. In order to complete the construction of the quartz block 14 to achieve the objects of the invention, a reflection grating 18 is usually machined directly onto the beveled face 17 thereof.

Figures 6, 7:
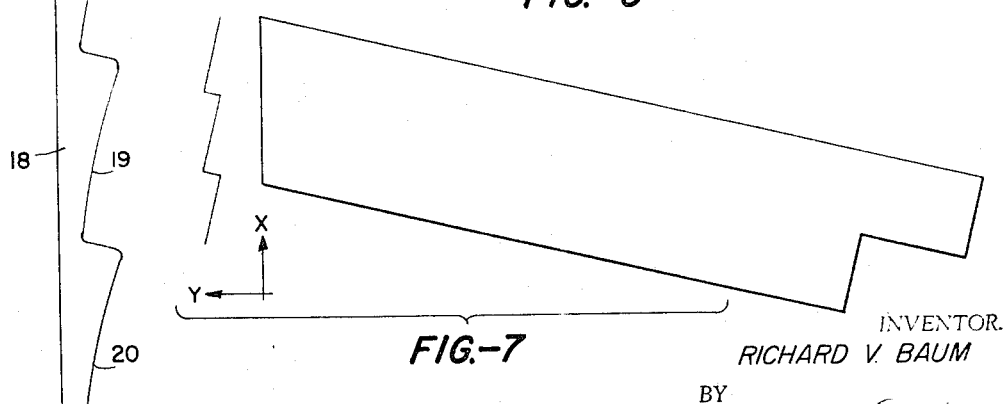
FIGURE 6 is an enlarged diagrammatic illustration of a portion of the reflecting grating illustrating the relation of the facings of the grating.
FIGURE 7 is a side elevational view of the quartz block similar to FIGURE 5 showing an enlarged relationship of the reflective grating to the quartz block.

For a better understanding of the reflection grating 18, reference should be had to FIGURE 6 which is an exploded view of a pair of reflector surfaces 19 and 20, respectively, of the grating 18. In the present embodiment, the invention contemplates that there shall be between about 50 and 150 surfaces, but preferably about 80 surfaces in the reflection grating. The number of reflection surfaces is dependent upon the characteristics of the ultrasonic pulse P and upon the desired characteristics of the received pulse. The reflector surfaces 19 and 20 are parallel to the transducers 15 and 16 to at least about .0001 inches per inch, or in the order of small fractions of the ultrasonic wave length transmitted through the medium. As indicated in FIGURE 4, the reflection grating 18 extends the width of the beveled face 17, but is centrally positioned and does not cover the full height of the beveled face 17, as seen in FIGURE 5. However, the dimensions or configuration of the reflection grating can be changed without altering the principles of the invention. It should further be noted that the reflector surfaces 19 and 20 in FIGURE 6 are slightly curved in order to achieve the desired reflection characteristics.

In the actual reflective grating 18 it is desired that the distance, $X_n$, from a reference point on the transmitting transducer 15 to the $n$th element of the grating and back to a reference point on the receiving transducer 16, be expressed as $X_n = (X_0 + nX)^2$ where $X_0$ and $X$ are dimensional constants and $N/2 \leq n \leq N/2$ for grating with $(N+1)$ total elements. Therefore, the reflection grating 18, together with the input and output transducers 15 and 16, respectively acts as a filter with a transfer function. This is represented by the following formula:

$$G(w) = G_1(w) G_2(w) \sum_{-\frac{N}{2}}^{\frac{N}{2}} e^{+\frac{jw(X_0+nX)^2}{V}}$$

where:

$G_1(w)$ represents the transfer function of the input transducer $G_2(w)$ represents the transfer function of the output transducer V represents the velocity of ultrasonic propagation in the medium $e$ is the base of the Naperian system of logarithms $j$ represents $\sqrt{-1}$ $w$ represents the standard $2\pi f$ where $f$ equals the frequency of the input signals Thus, the transfer function of the grating 18, with its quadratic variation of phase with $n$, is a discrete analog of the continuous filters used in the reference reports on "Chirp" networks and methods disclosed by Bell Laboratories as cited above.

Thus, it is seen that the objects of the invention are achieved by providing a quartz block transfer medium quartz crystal transducers placed thereon which are electrically excited with the desired ultrasonic pulse and are reflected by a reflection grating cut into the quartz block to achieve the desired pulse expansion or compression. The dimensions and characteristics of the reflector surfaces of the reflection grating are of extremely close tolerance which are of the order of small fractions of the ultrasonic wave length transmitted through the medium. Normally the grating spacing is varied as in a Fresnel lens to allow all the grating faces to lie on the same planar surface. If the grating spacing is uniform it must be in offset parallel aligned relationship to the transmitting and receiving transducers to achieve the objects of the invention.

While in accordance with the patent statutes only one embodiment of the invention has been illustrated and described in detail, it is to be particularly understood that the invention is not limited thereto or thereby, but that the inventive scope is defined in the appended claims.

What is claimed is:

1. In an apparatus to effect expansion or compression of a pulse the combination of
    a substantially rectangularly shaped quartz block having one beveled cut off end and the other end step cut to provide a substantially rectangularly shaped extension therefrom,
    a reflective grating cut into the beveled cut off end of the quartz block to reflect any sonic wave impinging thereon in proportion to frequency, said grating comprising between about 50 and about 150 curved reflector surfaces arranged sequentially to be responsive to successively increasing or decreasing pulse frequencies,
    an input transducer operatively affixed to the end of the shorter part of the step cut, and
    an output transducer operatively affixed to the extended part of the step cut, said transducer being in substantially parallel relationship to said reflector surfaces of said reflective grating.

2. In an apparatus to effect expansion or compression of a pulse the combination of
    a substantially rectangularly shaped quartz block having one beveled cut off end and the other end step cut to provide a substantially rectangularly shaped extension therefrom, a reflective grating cut into the beveled cut off end of the quartz block to reflect any sonic wave impinging thereon in proportion to frequency, said grating comprising about 80 reflector surfaces arranged sequentially to be responsive to successively increasing or decreasing pulse frequencies, a transducer operatively affixed to the end of the shorter part of the step cut, and a transducer operatively affixed to the extended part of the step cut, said transducer being in substantially parallel relationship to said reflector surfaces of said reflective grating.

3. In an apparatus to filter pulses for expansion or compression the combination of a medium having physical properties capable to transmit ultrasonic pulses, reflective grating means operatively affixed to said medium to reflect said ultrasonic pulses, said reflective means comprising a plurality of reflector surfaces arranged to be successively proportional to frequency, an input means operatively affixed to said medium to transmit ultrasonic pulses into said medium and direct said pulses towards said reflective means, an output means operatively affixed to said medium and designed to receive said reflected pulses from said reflective means and transmit them from said medium, said output means being at a different distance from said reflective means than said input means and on the same side thereof, and said reflector surfaces being substantially parallel to said input and output means by at least about .0001 inches per inch, and said reflector surfaces being at successively varying distances from said input and output means.

4. In an apparatus to filter pulses for expansion or compression the combination of a medium having physical properties capable to transmit ultrasonic pulses, a reflective means operatively affixed to said medium to reflect said ultrasonic pulses, said reflective means having non-uniform spacing and comprising a plurality of reflector surfaces arranged to be successively proportional to frequency, a pair of transducer means operatively affixed at one end to said medium with one adapted to transmit ultrasonic pulses into said medium and direct said pulses towards said reflective means and the other adapted to receive said reflected pulses from said reflective means and transmit them from said medium, and said reflector surfaces being substantially parallel to said transducer means, said reflector surfaces reflecting the pulses within the medium in proportion to frequency, and where the distance from a reference point or one transducer means to the last reflector means is expressed as $X_n = (X_0 + nX)^2$ where $X_0$ and $X$ are dimensional constants and $N/2 \leq n \leq N/2$ for a reflector with $N+1$ total surfaces.

References Cited by the Examiner

UNITED STATES PATENTS

| | | | |
|---|---|---|---|
| 2,169,304 | 5/1939 | Tournier | 333—72 |
| 2,416,338 | 2/1947 | Mason | 333—30 |
| 2,643,286 | 6/1953 | Hurwitz | 333—30 |
| 2,965,851 | 12/1960 | May | 333—30 |
| 3,070,761 | 12/1962 | Rankin | 333—30 |
| 3,108,279 | 10/1963 | Eisentraut | 88—1 X |
| 3,213,452 | 10/1965 | Carpentier et al. | 343—17.2 |

FOREIGN PATENTS

| | | |
|---|---|---|
| 946,708 | 1/1964 | Great Britain. |
| 988,102 | 4/1965 | Great Britain. |

HERMAN KARL SAALBACH, *Primary Examiner.*

C. BARAFF, *Assistant Examiner.*